Nov. 22, 1932. C. E. GREENE 1,888,857
COMBINATION SLED AND TOBOGGAN
Filed April 21, 1931
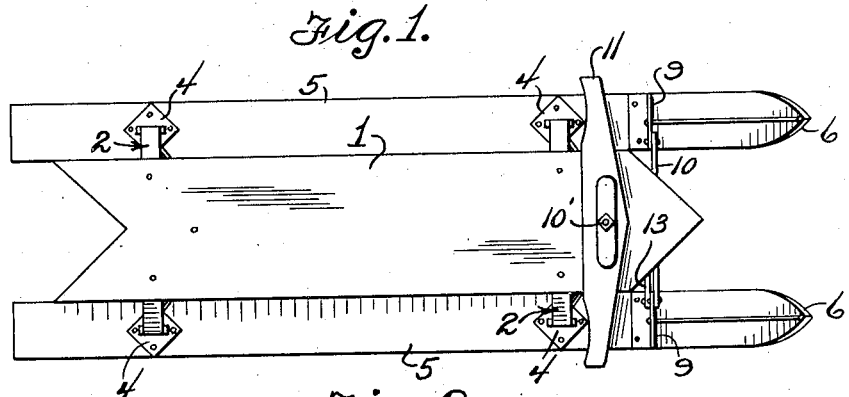
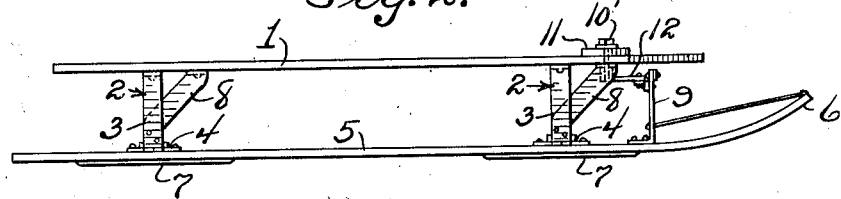
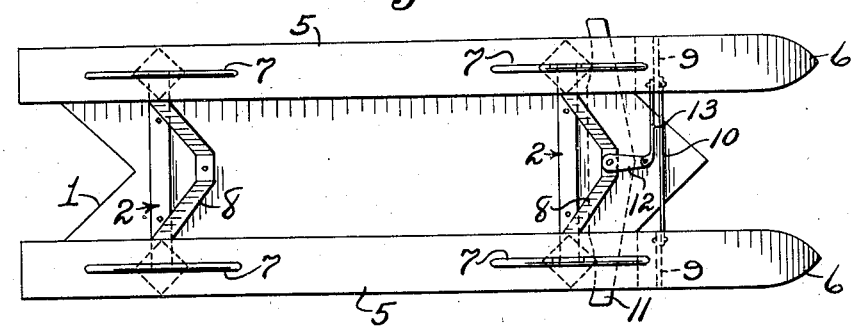
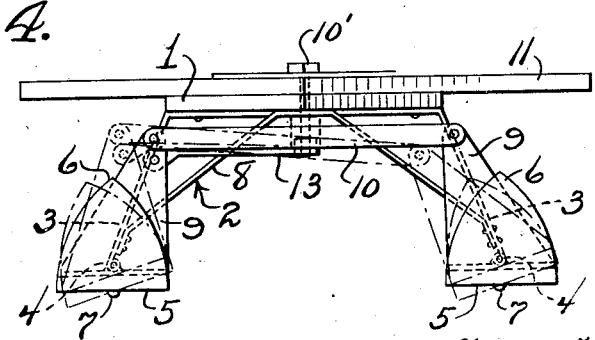
Carroll E. Greene
INVENTOR
BY Victor J. Evans
and Co. ATTORNEYS Patented Nov. 22, 1932

1,888,857

UNITED STATES PATENT OFFICE

CARROLL E. GREENE, OF SOUTH RYEGATE, VERMONT

COMBINATION SLED AND TOBOGGAN

Application filed April 21, 1931. Serial No. 531,828.

This invention relates to a combination sled and toboggan and has for the primary object, the provision of runners having all of the advantages of a conventional type of toboggan with means whereby the runners may be tilted for the purpose of steering the device with ease and safety.

Another object of this invention is the provision of pivotal mountings between the seat or bed of the sled and the runners so that the latter may be simultaneously tilted through the operation of a steering medium and which will be easily controlled by a person either sitting or lying upon the seat or bed.

A further object of this invention is the provision of means between said runners and the steering medium, whereby one runner will be tilted toward one side edge and the other runner simultaneously tilted toward or on the other edge so that a turn may be negotiated with safety and requiring only minimum effort on the part of the person steering.

A still further object of this invention is the provision of a combination sled and toboggan which will be simple, durable and efficient and which may be manufactured and sold at a comparatively low cost.

With these and other objects in view, this invention consists in certain novel features of construction, combination and arrangement of parts to be hereinafter fully described and claimed.

For a complete understanding of my invention, reference is to be had to the following description and accompanying drawing, in which Figure 1 is a top plan view illustrating a combination sled and toboggan constructed in accordance with my invention.

Figure 2 is a side elevation illustrating the same.

Figure 3 is a bottom plan view illustrating the construction of the runners.

Figure 4 is a front elevation illustrating in full and dotted lines the various positions occupied by the runners during the steering of the device.

Referring in detail to the drawing, the numeral 1 indicates a bed or a seat having secured to its under face adjacent each end reinforcing members 2 which are of substantial U-shape providing depending legs 3 which have their ends secured to runners 5 by hinges 4. The runners 5 are of elongated formation and of considerable length so that they project beyond both ends of the bed or seat 1 as clearly shown in Figure 1, having their front ends curved upwardly and pointed as illustrated at 6. The width of the runners is considerable so as to provide comparatively wide bearing surfaces for the runners to engage the snow or ice and at spaced intervals the bearing faces of the runners are provided with elongated ribs 7 to prevent lateral skidding of the runners and which will not retard the forward motion of the runners over the snow or ice to any great extent.

The legs are reinforced by braces 8 secured to said legs and to the under side of the bed or seat 1 and which are of substantial U shape as shown in Figure 2.

Tapering arms 9 are secured to the upper faces of the runners adjacent their forward curved and pointed ends 6 and are pivotally connected by a link 10 for causing the simultaneous movement of the runners through a steering medium, which will be hereinafter more fully described, and relative to the legs 3 which connect the runners to the bed or seat 1 of the device.

A steering post 10' is journalled to the bed or seat 1 adjacent the forward end of the latter and has attached thereto a steering member 11 to be actuated through either the feet or hands of a person occupying a position on the seat or bed 1. A forwardly extending arm 12 is connected to the steering post and underlies the seat or bed 1 and is pivotally connected to one of the arms 9 by a link 13 so that turning the steering post in one direction the runners will be tilted so as to steer the device on a turn in one direction and the reverse movement of the steering post will cause a tilting of the runners in an opposite direction to steer the device on a turn in an opposite direction from that heretofore mentioned.

By reference to Figure 4 it will be noted that when the runners are tilted by turning the steering post in one direction, one runner will be tilted inwardly while the other runner will be tilted outwardly and when the steering post is turned in an opposite direction, the runners reverse their position from that described, consequently providing a very efficient means whereby the device may be steered with minimum effort on the part of the person steering and further providing a device having all of the advantages of a toboggan.

While I have shown and described the preferred embodiment of my invention, it will be understood that minor changes in construction, combination and arrangement of parts may be made without departing from the spirit and scope of my invention as claimed.

Having thus described my invention, what I claim is:

A sled comprising a seat, legs on said seat, flat runners hinged to the legs, tapered arms secured to the runners and the width of said arms where secured to said runners being substantially equal to the width of the runners, a link pivoted to the reduced ends of the arms, a steering post carried by the seat, an element secured to the post and extending forwardly thereof and located under the seat, an arm pivoted to the forward end of the element and to the link adjacent the latter's connection to one of the tapered arms, and a handle secured to the post and extending across the upper face of the seat.

In testimony whereof I affix my signature.

CARROLL E. GREENE.